US007471815B2

(12) United States Patent
Hong et al.

(10) Patent No.: US 7,471,815 B2
(45) Date of Patent: Dec. 30, 2008

(54) CANDIDATE GENERATION FOR LUNG NODULE DETECTION

(75) Inventors: Lin Hong, Monmouth Junction, NJ (US); Yonggang Shi, San Diego, CA (US); Hong Shen, Princeton, NJ (US); Shuping Qing, Princeton, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 495 days.

(21) Appl. No.: 11/170,421

(22) Filed: Jun. 29, 2005

(65) Prior Publication Data
US 2006/0044310 A1 Mar. 2, 2006

Related U.S. Application Data

(60) Provisional application No. 60/605,787, filed on Aug. 31, 2004.

(51) Int. Cl.
G06K 9/00 (2006.01)
A61B 6/00 (2006.01)
G01N 23/00 (2006.01)
G21K 1/12 (2006.01)
H05G 1/60 (2006.01)

(52) U.S. Cl. .............................. 382/128; 378/4; 378/21
(58) Field of Classification Search ......... 382/128–132; 378/4–27
See application file for complete search history.

(56) References Cited

U.S. PATENT DOCUMENTS

| 5,175,773 | A | * | 12/1992 | Garreau et al. | 382/130 |
| 6,138,045 | A | * | 10/2000 | Kupinski et al. | 600/425 |
| 6,246,784 | B1 | * | 6/2001 | Summers et al. | 382/128 |
| 6,738,063 | B2 | * | 5/2004 | Shen et al. | 345/424 |
| 7,043,064 | B2 | * | 5/2006 | Paik et al. | 382/128 |
| 7,206,462 | B1 | * | 4/2007 | Betke et al. | 382/280 |
| 7,274,810 | B2 | * | 9/2007 | Reeves et al. | 382/128 |
| 7,298,879 | B2 | * | 11/2007 | Wiemker | 382/128 |
| 7,301,535 | B2 | * | 11/2007 | Shen | 345/424 |
| 2002/0009215 | A1 | * | 1/2002 | Armato et al. | 382/131 |
| 2002/0028008 | A1 | * | 3/2002 | Fan et al. | 382/131 |
| 2003/0105395 | A1 | * | 6/2003 | Fan et al. | 600/425 |
| 2003/0146913 | A1 | * | 8/2003 | Shen et al. | 345/419 |
| 2003/0160786 | A1 | * | 8/2003 | Johnson | 345/419 |
| 2004/0086161 | A1 | * | 5/2004 | Sivaramakrishna et al. | 382/131 |
| 2004/0252870 | A1 | * | 12/2004 | Reeves et al. | 382/128 |
| 2005/0001832 | A1 | * | 1/2005 | Shen et al. | 345/419 |
| 2005/0207630 | A1 | * | 9/2005 | Chan et al. | 382/131 |

(Continued)

OTHER PUBLICATIONS

Giger, Maryellen L., "Computerized Detection of Pulmonary Nodules in Computed tomography Images" *Investigative Radiology* 29:4 459-465 1994.

*Primary Examiner*—Manav Seth

(57) ABSTRACT

A computer-implemented method for candidate generation in three-dimensional volumetric data comprises forming a binary volumetric image of the three-dimensional volumetric data including labeled foreground voxels, estimating a plurality of shape features of the labeled foreground voxels in the binary volumetric data including, identifying peak voxels and high curvature voxels from the foreground voxels in the binary volumetric image, accumulating a plurality of confidence values for boundary and each peak voxel, and detecting confidence peaks from the plurality of confidence values, wherein the confidence peaks are determined to be the candidate points, and refining the candidate points given detected confidence peaks, wherein refined candidate points are determined to be candidates.

15 Claims, 5 Drawing Sheets

U.S. PATENT DOCUMENTS

| | | | |
|---|---|---|---|
| 2005/0259855 A1* | 11/2005 | Dehmeshki | 382/131 |
| 2006/0050939 A1* | 3/2006 | Wiemker | 382/128 |
| 2006/0066615 A1* | 3/2006 | Shen | 345/424 |
| 2006/0093217 A1* | 5/2006 | Hong et al. | 382/181 |
| 2007/0081710 A1* | 4/2007 | Hong et al. | 382/128 |
| 2007/0081725 A1* | 4/2007 | Hong | 382/173 |
| 2007/0127802 A1* | 6/2007 | Odry et al. | 382/131 |

* cited by examiner

CANDIDATE GENERATION FOR LUNG NODULE DETECTION

This application claims priority to U.S. Provisional Application Ser. No. 60/605,787, filed on Aug. 31, 2004, which is herein incorporated by reference in its entirety.

BACKGROUND OF THE INVENTION

1. Technical Field

The present invention relates to image analysis, and more particularly to a candidate generation method for generating a list of targeted candidates from 3D volumetric data.

2. Discussion of Related Art

A candidate generation method that is able to reliably and accurately detect nodule candidates from input 3D volumetric data plays a critical role in automatic nodule detection. In a typical 3D volumetric data (with a dimension of 512 by 512 by 300), non-nodule (background tissue) structures such as vessel trees, which includes of the dominating portion of the distinguishable objects in the volumetric data, are extreme complex in formation. Targeted nodules, on the other hand, merely are a few compact round shaped objects, which reside nearby or occlude with the complex background tissue structures. There is no discriminating feature that can be easily determined to differentiate the targeted nodules from the complex background tissue structures. There are a huge number of locations where background tissues exhibit nodule-like properties. It is very difficult to design a method that is able to reliably and accurately identify the few true positions where true nodule present by efficiently reject those huge number of impostor locations. In addition, the amount of information needs to be processed in 3D volumetric data is huge (a chest HRCT (high resolution computer tomography) data is typically of dimension 512×512×300). It is typically not practical to employ a technique applying sophisticated and computationally expensive analysis to every position (voxel) in 3D volumetric data.

Therefore, a need exists for a system and method for a computationally efficient candidate generation method.

SUMMARY OF THE INVENTION

According to an embodiment of the present disclosure a computer-implemented method for candidate generation in three-dimensional volumetric data comprises forming a binary volumetric image of the three-dimensional volumetric data including labeled foreground voxels, estimating a plurality of shape features of the labeled foreground voxels in the binary volumetric data including, identifying peak voxels and high curvature voxels from the foreground voxels in the binary volumetric image, accumulating a plurality of confidence values for boundary and each peak voxel, and detecting confidence peaks from the plurality of confidence values, wherein the confidence peaks are determined to be the candidate points, and refining the candidate points given detected confidence peaks, wherein refined candidate points are determined to be candidates.

Forming the binary volumetric image comprises lowpass-filtering the three-dimensional volumetric data, removing boundaries of the three-dimensional volumetric data, segmenting the three-dimensional volumetric data into foreground and background portions, wherein voxels in the foreground are labeled, and determining region growing labels for all foreground objects greater than a predetermined size, wherein foreground objects comprise a plurality of the foreground voxels and the predetermined size is a number of voxels.

The segmenting comprises determining an estimated threshold of voxel intensity and comparing each voxel to the estimate threshold to determine foreground voxels, and labeling the foreground voxels.

The accumulating the plurality of confidence values comprises determining a surface patch around each peak voxel, determining a confidence array comprising confidence scores for each high curvature point and peak point on a boundary or about a center of each surface patch, comparing the confidence scores around a voxel to a threshold for determining the presence of the candidate points, and labeling points having desirable confidence scores to by candidate points.

The refining the candidate points comprises repositioning candidate points, adjusting confidence scores of the candidate points, sorting the candidate points according to adjusted confidence scores, and returning the top n candidate points as target objects, wherein n is a positive integer. According to an embodiment of the present disclosure, a program storage device is provided, readable by machine, tangibly embodying a program of instructions executable by the machine to perform method steps for candidate generation in three-dimensional volumetric data. The method comprises forming a binary volumetric image of the three-dimensional volumetric data including labeled foreground voxels and estimating a plurality of shape features of the labeled foreground voxels in the binary volumetric data comprising. Estimating the plurality of shape features comprises identifying peak voxels and high curvature voxels from the foreground voxels in the binary volumetric image, accumulating a plurality of confidence values for each boundary and each peak voxel, detecting confidence peaks from the plurality of confidence values, wherein the confidence peaks are determined to be the candidate points. The method further comprises refining the candidate points given detected confidence peaks, wherein refined candidate points are determined to be candidates.

According to an embodiment of the present disclosure, a computer-implemented method for generating nodule candidates in three-dimensional volumetric data comprises determining a plurality of foreground objects in the three-dimensional volumetric data, determining a plurality of shape features of the plurality of foreground objects, wherein the shape features are derived from a cross section analysis of the three-dimensional volumetric data, the cross section analysis comprising selecting foreground objects having desirable shape features, and labeling selected foreground objects as candidates, and returning the candidates.

The cross section analysis comprises identifying peak voxels and high curvature voxels from the foreground objects in the binary volumetric image, accumulating a plurality of confidence values for each boundary voxel and each peak voxel, and detecting confidence peaks from the plurality of confidence values, wherein the confidence peaks are determined to be the candidates. The method comprises classifying a voxel as a peak voxel if and only if the voxel is classified as peak voxel in all its cross sections of the three-dimensional volumetric data. The method comprises classifying a voxel as a high curvature point if and only if the voxel is not a peak voxel and is classified as a peak voxel or a high curvature voxel in all its cross sections of the three-dimensional volumetric data.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

Typically, a lung nodule exhibits compact round shape property. It may either be a solid object or occludes with vessel tree. A number of techniques are available to determine 3D shape features that can be used to differentiate between compact round shaped nodules from objects with other shape properties. However, these techniques are not efficient in such a scenario for a number of reasons such as robustness to noise, irregularity of the targeted objects (difficult to estimate a consistent Gaussian curvature value), difficulty in defining targeted region of interest, and computational cost. According to an embodiment of the present disclosure, a method generates nodule candidates efficiently in 3D volumetric data (e.g., computer tomography data (CT) or magnetic resonance imaging data (MRI)) using shape features that are derived from a number of cross section analysis. It has been demonstrated on two sets of HRCT images that such a technique can achieve a very high accuracy with a limit amount of computational cost.

Figure 1:
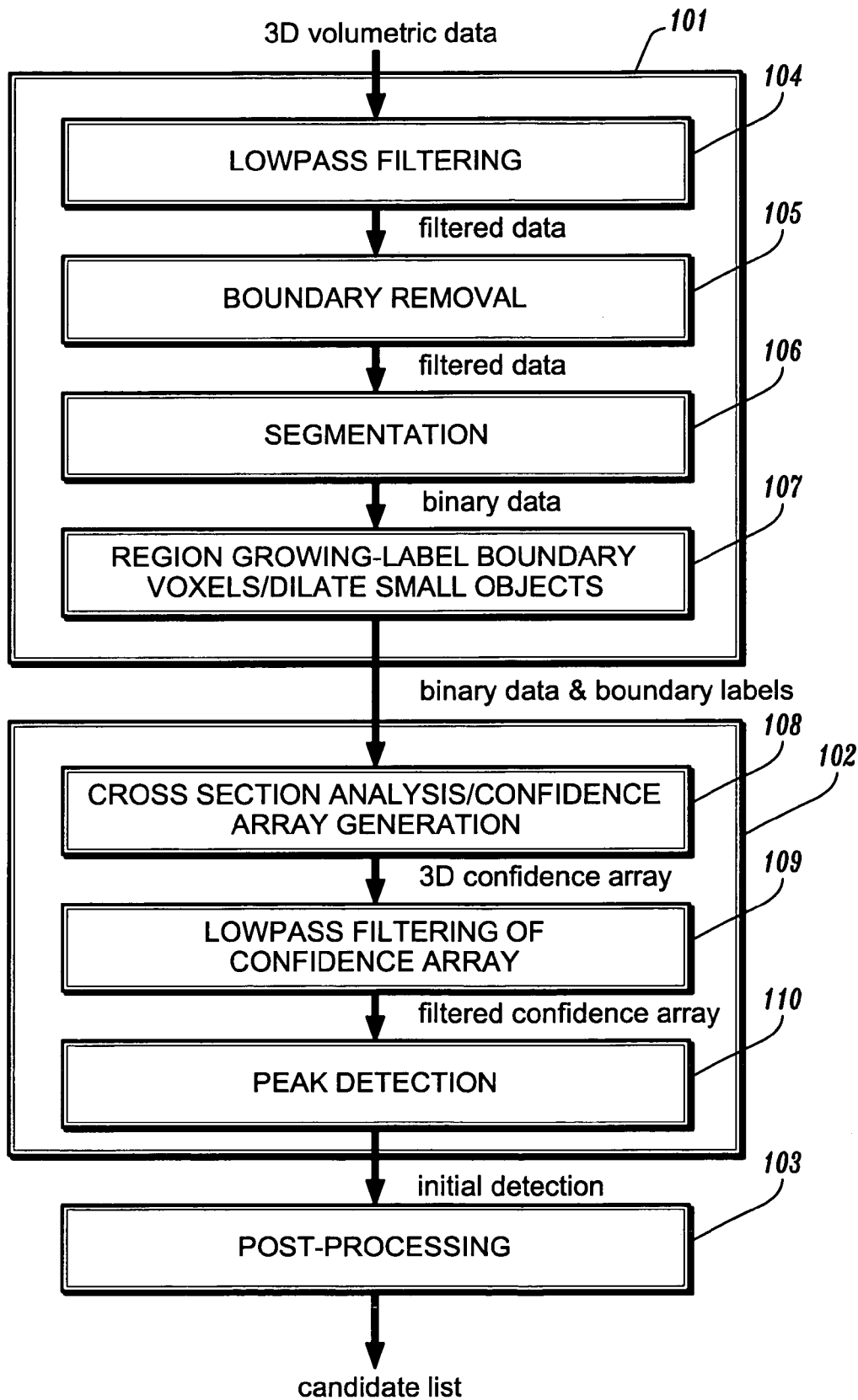
FIG. 1 is a flow chart of a method for candidate generation according to an embodiment of the present disclosure.

According to an embodiment of the present disclosure, a method for candidate detection comprises a processing block 101, in which nodules and background tissue structures with high intensity values such as vessel trees are labeled as foreground objects to form a binary volumetric image, a detection block 102, in which shape features are estimated using cross section analysis; high curvature segments are identified; confidence values are accumulated along with the cross section analysis; confidence peaks are detected from the confidence value and object intensity value, and a post-processing block 103 is applied to refine the candidate results (see FIG. 1).

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 2:
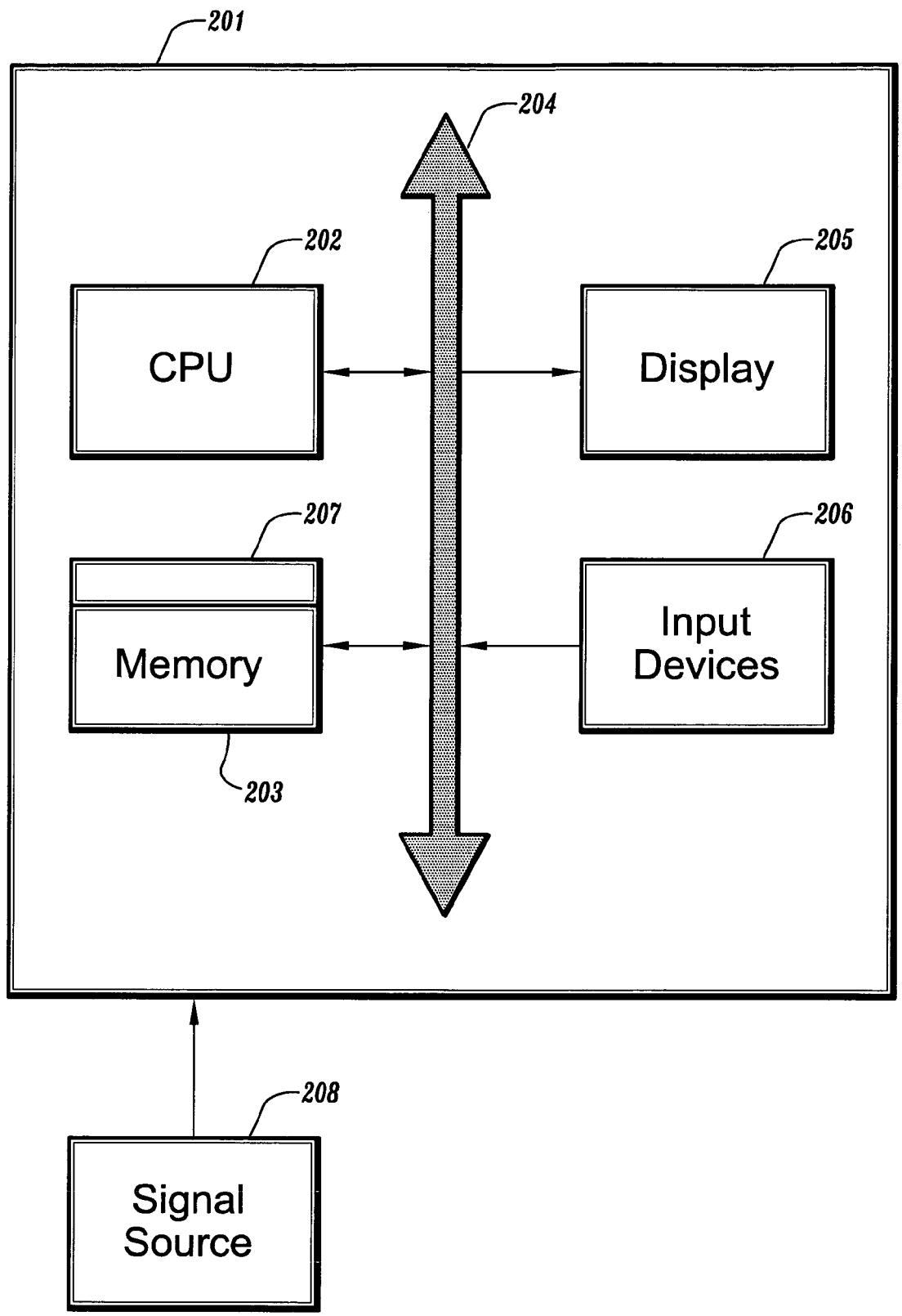
FIG. 2 is an illustration of a system according to an embodiment of the present disclosure.

Referring to FIG. 2, according to an embodiment of the present disclosure, a computer system 201 for implementing a method for generating candidates in 3D volumetric data can comprise, inter alia, a central processing unit (CPU) 202, a memory 203 and an input/output (I/O) interface 204. The computer system 201 is generally coupled through the I/O interface 204 to a display 205 and various input devices 206 such as a mouse and keyboard. The display 205 can display views of the virtual volume and registered images. The support circuits can include circuits such as cache, power supplies, clock circuits, and a communications bus. The memory 203 can include random access memory (RAM), read only memory (ROM), disk drive, tape drive, etc., or a combination thereof. The present invention can be implemented as a routine 207 that is stored in memory 203 and executed by the CPU 202 to process the signal from the signal source 208. As such, the computer system 201 is a general purpose computer system that becomes a specific purpose computer system when executing the routine 207 of the present invention.

The computer platform 201 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

The processing stage 101 includes lowpass filting 104, boundary removal 105, segmentation 106 and region growing 107.

Lowpass filtering 104 of input 3D volumetric CT data improves binarization of targeted foreground objects (smooth boundary) and improves an estimation of different shape parameters in the later processing steps (normal direction, curvature, etc.). Lowpass filtering 104 can be carried out in a number of different ways. One method of lowpass filtering is filtering in the x-y plane. The lowpass filter can be a 3D Gaussian filter with the same standard deviation value in the x- and the y-dimensions, which has a default value of, for example, 2. The lowpass filtering is applied to each slice independently.

For boundary removal 105 each voxel near to the edge (for example, 5 voxels away from the volumetric data boundary) of the 3D volumetric CT data is cleared to ensure that the later steps do not need to handle the boundary voxels, which have a different neighborhood definition. This significantly simplifies the implementation of late processing steps.

Segmentation 106 labels the foreground objects, including vessels, nodules, and other tissues with higher intensity values than other voxels in input CT images (the value of intensity that denotes a foreground object may be tuned automatically or by a user) from the background (everything else) to form binary volumetric images. This is achieved by binarization of input volumetric images. Such a binarization process should be able to correctly label all nodules as foreground objects. Any nodules that are not labeled as foreground objects cannot be detected in the later processing steps. It is also important that labeled foreground objects do not contain too many background voxels, which tends to make the nodules in differentiatable in shape from other non-target foreground structures and thus significantly reduce the possibility of the nodules being correctly identified. The segmentation 106 is implemented slice by slice along the z-dimension using an adapted threshold method.

Figure 3:
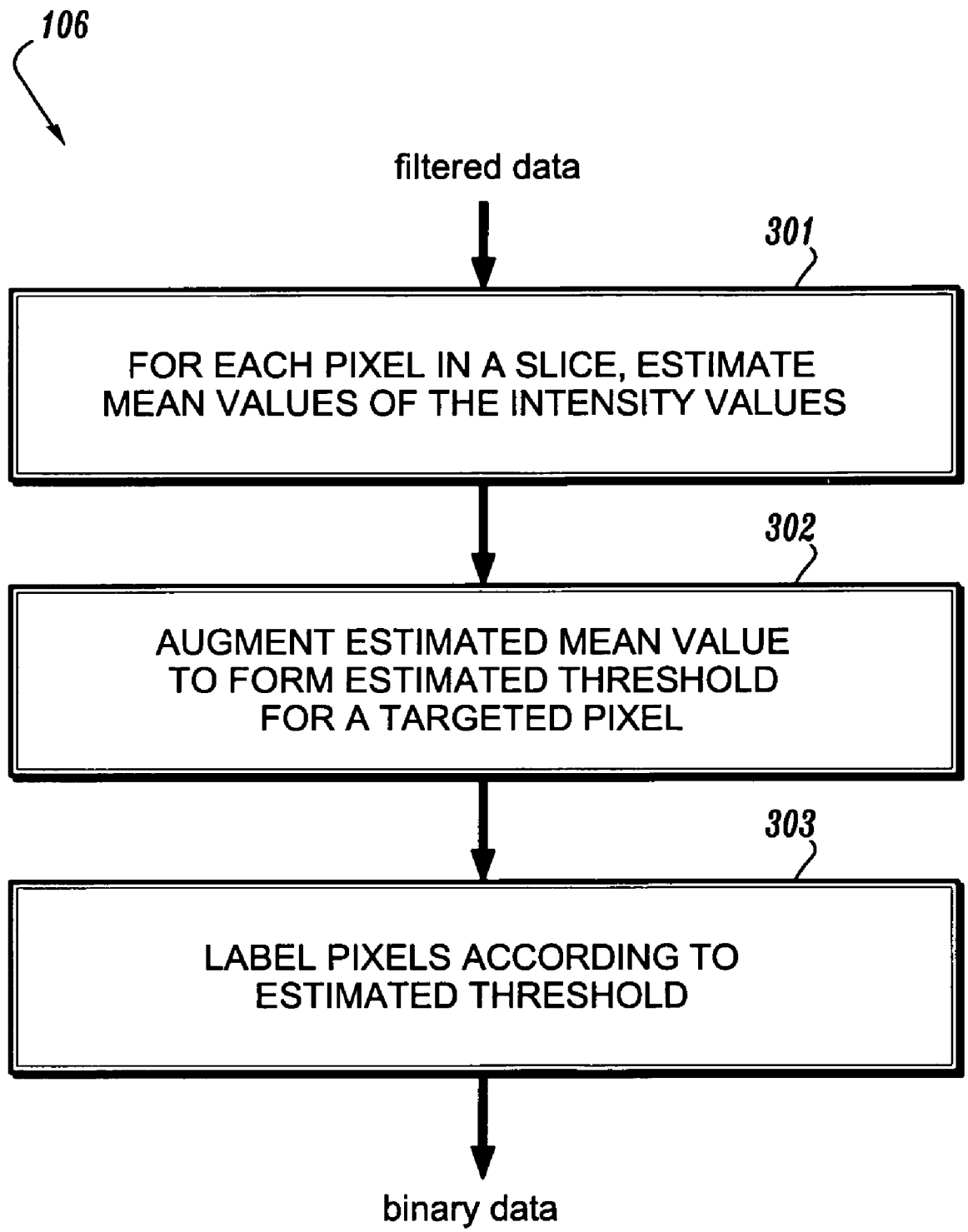
FIG. 3 is a flow chart of a segmentation method for according to an embodiment of the present disclosure.

Referring to FIG. 3, the adaptive threshold method comprises an estimate for the mean values of the intensity values that are in a pre-defined range within a window of a significant size, about 40×40, around the targeted pixel. The estimate is determined for each pixel in a slice 301. An example of the pre-defined range is 0-800. The estimated mean value is augmented with a pre-defined offset (e.g., 350) to form the estimated threshold (ET) for the targeted pixel 302. If ET is larger than the pre-defined high threshold (e.g., 800), then it is set to the pre-defined high threshold. If the percentage of voxels with their intensity values below the pre-defined low threshold is larger than the pre-defined threshold (e.g., 70%), then ET is set to the pre-defined low threshold. If the intensity value of the targeted pixel is larger than the estimated threshold ET, the pixel is labeled as foreground 303.

Region growing labels all the foreground voxels as well as boundary voxels, which are used in later processing. In block 107, a morphological dilation operation is applied to all connected foreground objects with size (number of voxels contained in the object) less than a pre-defined threshold (e.g., 100). The motivation of the morphological operation is to ensure reliable curvature estimate in the later processing steps.

The detection stage 102 includes a cross section analysis 108, a lowpass filtering of a confidence array 109, and peak detection 110.

The cross section analysis 108 detects compact round-shaped objects from the labeled foreground regions generated in the previous steps by decomposing the segmented volumetric data into a number of cross sections and analyzing the curves (boundary) traced in the cross sections to accumulate evidence abound the traced curves. A 3D array (confidence array) of the same size as the input 3D volumetric CT data is established to keep track of accumulated evidence. If there is a nodule, a larger number of high curvature points can be detected on the 2D curves in each cross section around the nodule than that of blood vessels and other non-nodule structures. A nodule may occlude with non-target foreground tissues sufficiently, there is a high probability that it generates more high curvature points on 2D cross section curves than the non-target foreground tissue structures.

Figure 4:
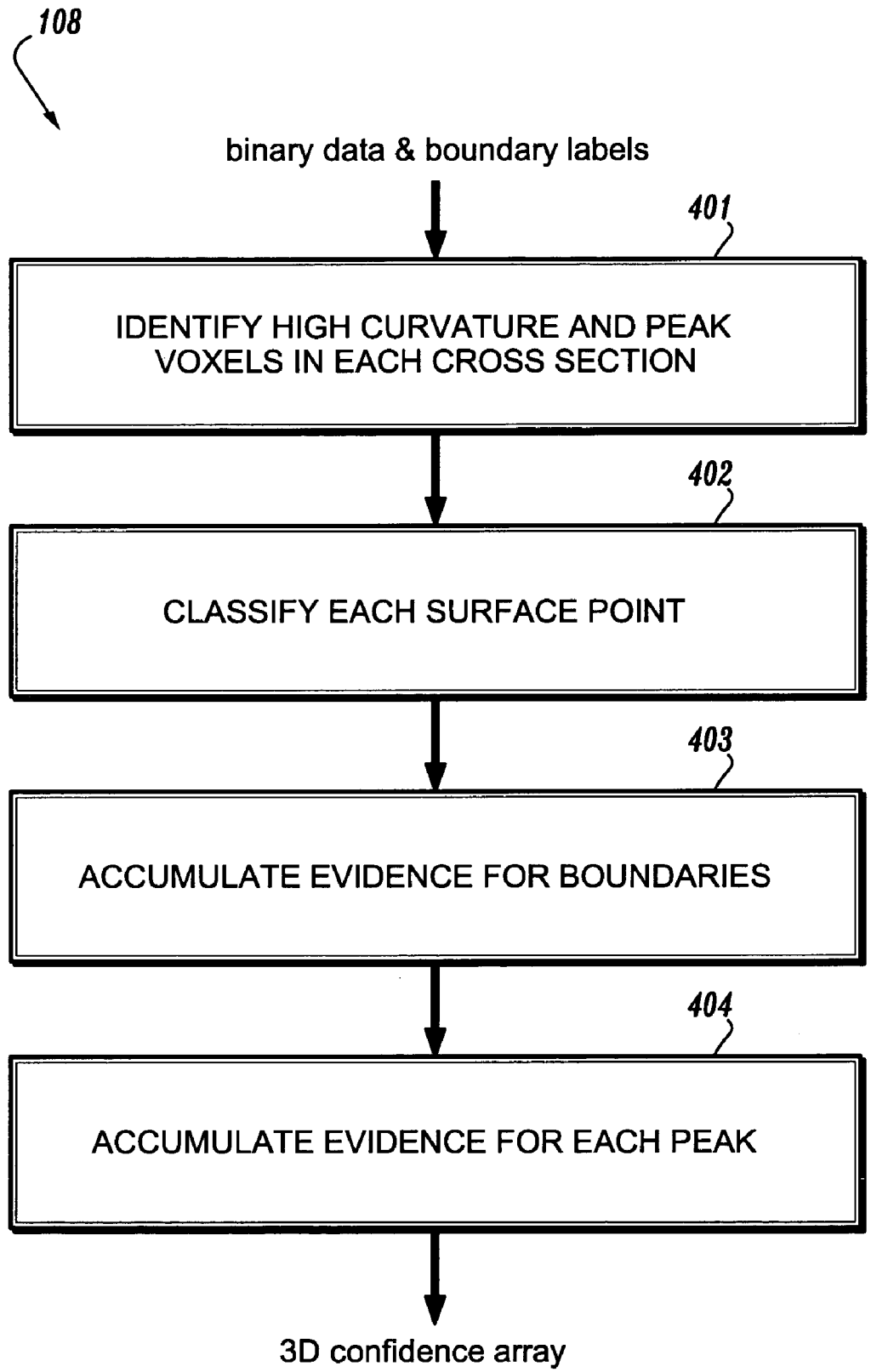
FIG. 4 is a flow chart of a method for cross section analysis according to an embodiment of the present disclosure.

Referring to FIG. 4, the cross section analysis 108 comprises identifying high curvature (curvature value being larger than a threshold, for example, 210 degrees) and peak (curvature value reaching a maximum at a local neighborhood, for example, a 15-point window centered at the peak) voxels in each cross section 401. The analysis classifies each surface point 402 to (i) a peak or (ii) a high curvature point or (iii) a normal point. A point is classified as a peak point if and only if the point is classified as peak point in all its cross sections. A point is a high curvature point if and only if the point is not a peak point and is classified as a peak or a high curvature point in all its cross sections. The cross section analysis accumulates evidence for boundary with significant percentage of high curvature points and peaks in each cross section 403. The cross section analysis accumulates confidence evidence for each peak 404:

Start from a peak point, a boundary patch growing method, which grows on the object surface points with high curvature or peak label and uses distance to the initial peak position and growing size to control the growing shape, is applied to generate a small surface patch. The generated patch is of a half sphere type of shape.

The normal direction is then estimated for each element point of the surface patch is determined.

The intersection of the normal lines of two high curvature elements on the surface patch is determined. If the intersection is near enough to the center of the surface patch, a confidence score whose value is determined by the point type (high curvature or peak) is added to intersection position in the confidence array. The proximity of the intersection to the center of the surface patch needed to add the intersection position to the confidence array may be tuned to achieve desirable results.

At each position, the confidence score in the confidence array indicates the likelihood that a nodule may present nearby. If a large number of nearby points exhibit confidence score value, it indicates that a nodule presents.

Due to the nodule shape variations as well as presence of complex non-target foreground structures in input volumetric data, the confidence score values around nodules and other nodule-like non-target foreground objects in the confidence array are sparsely distributes with cluster-like formations. A lowpass filtering block 109 is thus needed for reliable genuine peak detection. Gaussian filters can be used. Filtering of confidence array is applied in all the x-, y-, and z-dimensions.

Figure 5:
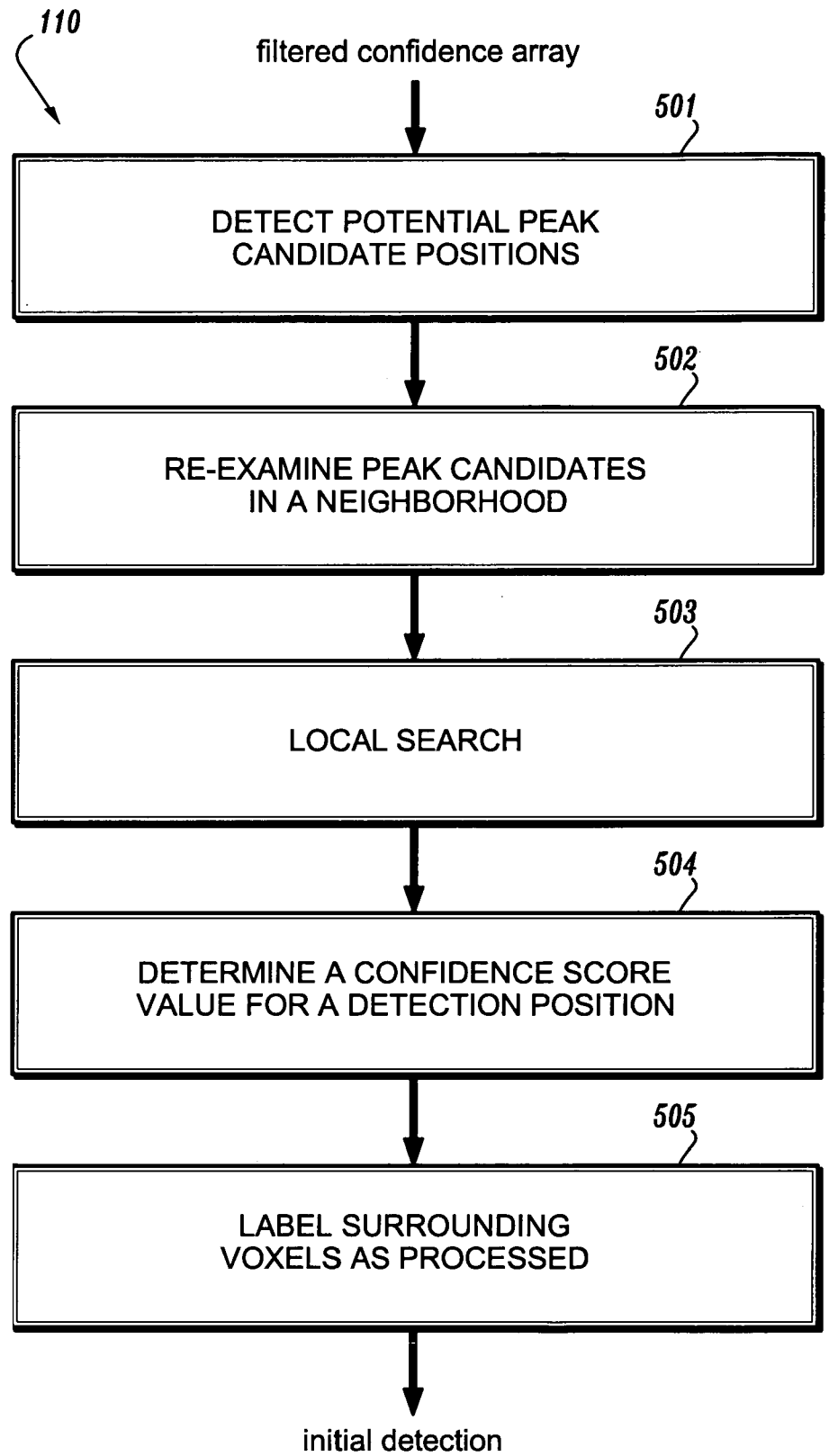
FIG. 5 is a flow chart of a method for peak detection according to an embodiment of the present disclosure.

Local Peak Detection:

Local peak detection 110 identifies significant concentrations of evidence in the confidence array to generate the initial detection candidates. FIG. 5 illustrates a method for local peak detection method in which:

A local maximum detection is first applied to detect potential peak candidate positions 501.

The peak candidate positions are then re-examined in a local neighborhood with a size of the same as the max detectable object (e.g., 10 mm) to ensure that it posits a the voxel with the max score value among the voxels that are not labeled as detected 502. A controlled volume growing method, which grows within the non-zero confidence array elements with a limited growing size, is applied to obtain the weighted sum and the updated max weight and the corresponding detected position (position with max confidence score value that does not necessarily reside in a foreground region).

If the detected position is not inside the foreground region, a local searching process is applied to find the nearest boundary point as the new detected position 503.

A control volume growing that grows within the foreground regions with a limited growing size is applied to obtain the updated weighted sum of confidence scores. A linear combination of max confidence score, summation of confidence scores in the growing regions, and local peak adjustment that weights the small size foreground objects is determined as the final confidence score value of the current detection and inserted along with detected position into detection list 504.

All surrounding voxels within a small distance to the detected position are labeled as processed 505.

Post-Processing:

Post-processing makes adjustments to the initial detected candidates. The initial detected candidate position is the position of detected peak in confidence array with a limited among of shift to ensure the position being in a foreground region, which may not be always in the targeted object region due to shape variation and morphological operation on some small foreground objects. The post-processing step implements a deformation method that uses an iterative gradient decent method to adjusts the position of a candidate to ensure that it is within the foreground region.

A candidate re-position method comprises:

Defining a cost function based on intensity, curvature, and image-gradient information to tune the initial detected position to the most possible foreground position.

Specifying the number of iterations of the deformation process that is controlled by a pre-defined parameter, which has a value of 4.

Adjusting the detected position along the direction that reaches the minimum cost value iteratively.

After the each position is adjusted, a normalization method is applied to adjust the final confidence score value. The normalization method comprises:

Defining a 3D neighborhood, which is of sphere shape.

Iteratively searching around the defined 3D neighborhood of each detected object position to check the consistency of foreground voxel profile.

Adjusting the detected position according to the max consistency value.

Adjusting the confidence score value of the detected candidate using a combination of consistency and average intensity value.

The normalization method ensures that the tuned candidate position is near the center of the targeted candidate object, and adjusts the confidence score using a combination of consistency value (standard variation of profile) and the average intensity value of the foreground object to make the final candidate results more accurate. Finally, the detected nodules are sorted according to the normalized confidence value. The top n candidates are returned, e.g., displayed or identified in the data. The returned candidates may then be diagnosed.

Experimental Results:

A method according to an embodiment of the present disclosure was tested on two sets of chest HRCT data. Data set 1 consisted of 40 volumetric data with x- and y-dimensions being 512×512. On average, the CT data consisted of 300 slices in the z-dimension with a minimum 246 slices and a maximum of 446 slices. Typically, there are tens of thousands of locations (imagine a 512×512×300 image with vessel trees and noise structures all over the image) where local tissue structures exhibit nodule-like properties in an input volumetric chest image. However, in data set 1, only a total of 109 ground truth nodules were identified by doctors. Note that even though there are only 109 nodules that are labeled by doctors as ground truths, there are a number of objects in both data sets that are similar to nodules that are not nodules or not identified as nodules, which could be either nodules missed by doctors or objects deemed to be normal vessel tree structures based on additional knowledge other than shape information.

The targeted application of the proposed technique is to be used in lung CAD system to generate nodule candidates from input lung CT images that are further validated by the lung CAD system using additional structural and contextual information. For the candidate generation method in practice, the true nodules should appear in the detected candidate list, which is may include 500 candidates, after filtering through the number of potential locations. Sensitivity, which is defined as the percentage of ground truth nodules detected in the candidate list among the all verified ground truth nodules, becomes a valid performance criterion. In the tests, this criterion was used to benchmark the performance of the proposed technique.

The experiment on data set 1 shows that the sensitivity of the proposed method is 96.4% for 500 candidate generation. The results show that the proposed object detection technique performs very well. It can be seem from the 3D view of the examples that the method is able to detect nodules with extensive occlusion with vessel trees, which demonstrates the efficiency of the proposed 3D object detection method in practical applications.

Data set 2 comprises 16 volumetric data with a dimension similar to data set 1. A total of 50 nodules were identified. This data set is not available to out research team. The performance test was conducted independently by the Siemens CAD group at Malvern, Pa. The sensitivity turned out to be 96% for 500 candidate generation.

Typically, the computational time for processing a CT data with 300 slice is about 35 seconds using a Dell P4 2.4 Ghz running Windows XP. The lowpass filter, binarization, and post-processing steps take up about 87% of the computational time.

Having described embodiments for a system and method for candidate generation in 3D volumetric data, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A computer-implemented method for candidate generation in three-dimensional volumetric data comprising:
performing, using a computer processor, the steps of:
forming a binary volumetric image of the three-dimensional volumetric data including labeled foreground voxels, where the foreground voxels comprising a plurality of pixels of the binary volumetric image; estimating a plurality of shape features of the labeled foreground voxels in a plurality of cross-sections of the binary volumetric data comprising: identifying high curvature voxels from the foreground voxels in the plurality of cross-sections as voxels having a curvature greater than a threshold curvature and identifying peak voxels among the voxels having the curvature greater than the threshold, wherein the peak voxels have a curvature value reaching a maximum with a local neighborhood of a predefined size, accumulating a confidence value for each peak voxel, wherein a confidence value for each peak voxel increases with a number of voxels having the curvature greater than the threshold in a patch grown around the peak voxel, detecting confidence peaks from the plurality of confidence values, wherein the confidence peaks are determined to be the candidate points; and refining the candidate points given detected confidence peaks, wherein refined candidate points constitute a candidate object in the three-dimensional volumetric data.

2. The computer-implemented method of claim 1, wherein forming the binary volumetric image comprises:
lowpass-filtering the three-dimensional volumetric data;
removing boundary voxels of the three-dimensional volumetric data;
segmenting the three-dimensional volumetric data into foreground and background portions, wherein voxels in the foreground are labeled; and
determining region growing labels for all foreground objects greater than a predetermined size, wherein foreground objects comprise a plurality of the foreground voxels and the predetermined size is a number of voxels.

3. The computer-implemented method of claim 2, wherein the segmenting comprises:
determining an estimated threshold of voxel intensity and comparing each voxel to the estimate threshold to determine foreground pixels; and
labeling the foreground pixels.

4. The computer-implemented method of claim 1, wherein the accumulating the plurality of confidence values comprises:
determining a surface patch around each peak voxel;

determining a confidence array comprising confidence scores for each high curvature point and peak point about a center of each surface patch;

comparing the confidence scores around a voxel to a threshold for determining the presence of the candidate points; and labeling voxels having desirable confidence scores to be candidate points.

5. The computer-implemented method of claim 1, wherein the refining the candidate points comprises:

repositioning candidate points;

adjusting confidence scores of the candidate points;

sorting the candidate points according to adjusted confidence scores; and returning the top n candidate points, wherein n is a positive integer.

6. The computer-implemented method of claim 5, wherein the top n candidate points are diagnosed.

7. A computer readable medium embodying a program of in instructions executable by the machine to perform method steps for candidate generation in three-dimensional volumetric data, the method steps comprising:

forming a binary volumetric image of the three-dimensional volumetric data including labeled foreground voxels, wherein the foreground voxels comprising a plurality of pixels of the binary volumetric image;

estimating a plurality of shape features of the labeled foreground voxels in a plurality of cross-sections of the binary volumetric data comprising, identifying high curvature voxels from the foreground voxels in the plurality of cross-sections as voxels having a curvature greater than a threshold curvature and identifying peak voxels among the voxels having the curvature greater than the threshold, wherein the peak voxels have a curvature value reaching a maximum with a local neighborhood of a predefined size, accumulating a confidence value for each peak voxel, wherein a confidence value for each peak voxel increases with a number of voxels having the curvature greater than the threshold in a patch grown around the peak voxel, detecting confidence peaks from the plurality of confidence values, wherein the confidence peaks are determined to be the candidate points; and refining the candidate points given detected confidence peaks, wherein refined candidate points constitute a candidate object in the three-dimensional volumetric data.

8. The computer readable medium of claim 7, wherein forming the binary volumetric image comprises:

lowpass-filtering the three-dimensional volumetric data;

removing boundary voxels of the three-dimensional volumetric data;

segmenting the three-dimensional volumetric data into foreground and background portions, wherein voxels in the foreground are labeled; and determining region growing labels for all foreground objects greater than a predetermined size, wherein foreground objects comprise a plurality of the foreground voxels and the predetermined size is a number of voxels.

9. The computer readable medium of claim 8, wherein the segmenting comprises:

determining an estimated threshold of voxel intensity and comparing each voxel to the estimate threshold to determine foreground pixels; and labeling the foreground pixels.

10. The computer readable medium of claim 7, wherein the accumulating the plurality of confidence values comprises:

determining a surface patch around each peak voxel;

determining a confidence array comprising confidence scores for each high curvature point and peak point about a center of each surface patch;

comparing the confidence scores around a voxel to a threshold for determining the presence of the candidate points; and labeling voxels having desirable confidence scores to be candidate points.

11. The computer readable medium of claim 7, wherein the refining the candidate points comprises:

repositioning candidate points;

adjusting confidence scores of the candidate points;

sorting the candidate points according to adjusted confidence scores; and returning the top n candidate points, wherein n is a positive integer.

12. The computer readable medium of claim 11, wherein the top n candidate points are diagnosed.

13. A computer-implemented method for generating nodule candidates in three-dimensional volumetric data comprising:

performing, using a computer processor, the steps of:

determining a plurality of foreground voxels in the three-dimensional volumetric data, wherein the foreground voxels comprising a plurality of pixels of the three-dimensional volumetric data; determining a plurality of shape features including at least one of the plurality of foreground voxels, wherein the shape features are derived from a cross section analysis of the three-dimensional volumetric data, the cross section analysis comprising: identifying high curvature voxels from the foreground voxels in the plurality of cross-sections as voxels having a curvature greater than a threshold curvature and identifying peak voxels among the voxels having the curvature greater than the threshold, wherein the peak voxels have a curvature value reaching a maximum with a local neighborhood of a predefined size, accumulating a confidence value for each peak voxel, wherein a confidence value for each peak voxel increases with a number of voxels having the curvature greater than the threshold in a patch grown around the peak voxel, detecting confidence peaks from the plurality of confidence values, wherein the confidence peaks are determined to be the candidates, and refining the candidate points given detected confidence peaks, wherein refined candidate points constitute the candidates in the three-dimensional volumetric data; and returning the candidates.

14. The computer-implemented method of claim 13, further comprising classifying a voxel as a peak voxel if and only if the voxel is classified as peak voxel in all its cross sections of the three-dimensional volumetric data.

15. The computer-implemented method of claim 13, further comprising classifying a voxel as a high curvature point if and only if the voxel is not a peak voxel and is classified as a peak voxel or a high curvature voxel in all its cross sections of the three-dimensional volumetric data.

* * * * *